July 18, 1939.   P. HEINISCH   2,166,148
PHOTOGRAPHIC CAMERA
Filed Sept. 27, 1937   2 Sheets-Sheet 1
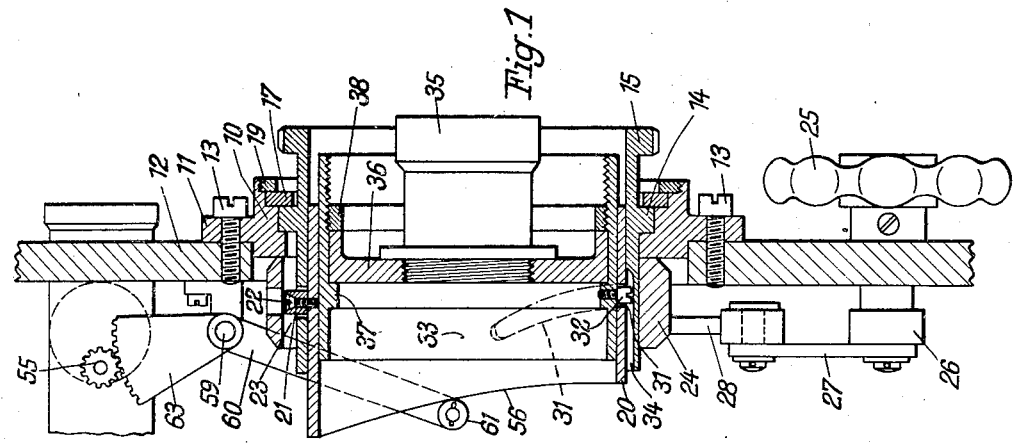
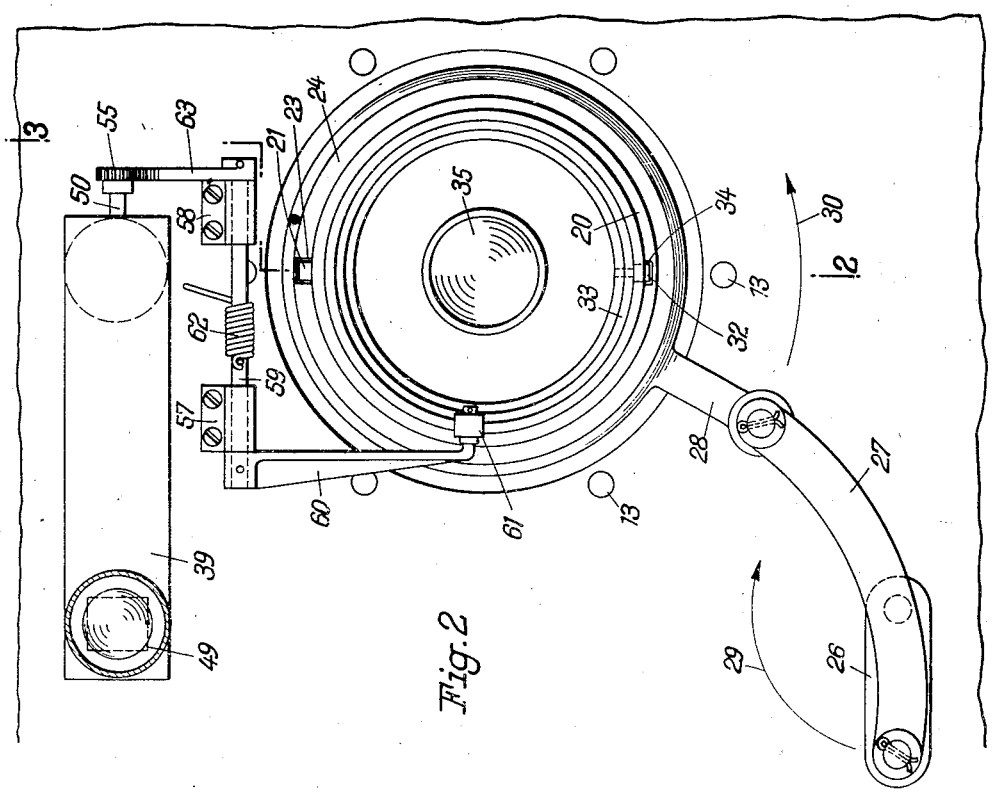
Inventor
Paul Heinisch July 18, 1939. P. HEINISCH 2,166,148
PHOTOGRAPHIC CAMERA
Filed Sept. 27, 1937 2 Sheets-Sheet 2
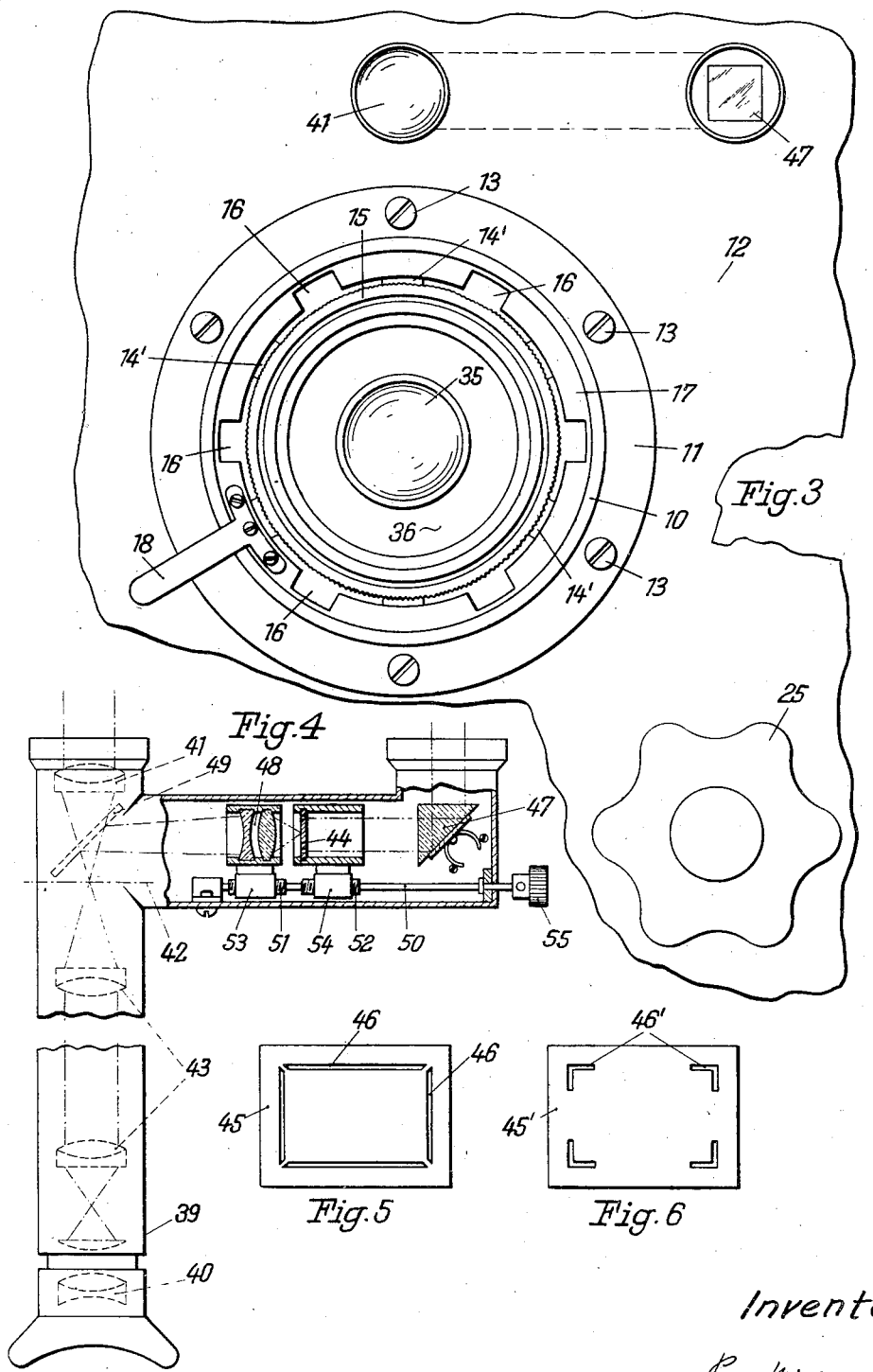
Inventor:
Paul Heinisch.

Patented July 18, 1939

2,166,148

UNITED STATES PATENT OFFICE 2,166,148

PHOTOGRAPHIC CAMERA

Paul Heinisch, Berlin-Zehlendorf, Germany, assignor to Askania-Werke A. G., a corporation of Germany Application September 27, 1937, Serial No. 166,010
In Germany October 24, 1936

2 Claims. (Cl. 88—1.5)

This invention relates to improvements in photographic cameras, more particularly moving picture cameras.

As far as I am aware the conventional view finders used hitherto with moving picture cameras have the disadvantage of not defining with certainty the limits of the photographic field. It is well known that the size of the photographic field is a function of the range adjustment of the objective lens.

It is therefore an object of this invention to provide an improved view finder defining clearly the limits of the image appearing on the light sensitive film of the camera.

According to this invention a reticle is provided which is visible through the view finder for indicating the limits of the photographic field. According to the adjustment and the focal length of the objective lens of the camera the image of the reticle is increased or decreased in size so that the operator can accurately determine the photographic field of the camera.

It is a further object of this invention to provide in a camera having a plurality of interchangeable objective lenses an improved view finder automatically defining the limits of the image of each of said objective lenses irrespective of the lens adjustment.

Further aims, objects and advantages of this invention will appear from a consideration of the description which follows with the accompanying drawings showing for purely illustrative purposes embodiments of this invention. It is to be understood, however, that the description is not to be taken in a limiting sense, the scope of this invention being defined in the appended claims.

Referring to the drawings:

Fig. 1 is a side elevation of a camera objective and a view finder, a second being taken on line 2—3 of Fig. 2.

Fig. 2 is a rear elevation of Fig. 1.

Fig. 3 is a front elevation of Fig. 1.

Fig. 4 is a plan view, partly in section, of the view finder of Figs. 1 to 3.

Figs. 5 and 6 are specific forms which the reticle of the view finder may assume.

A front piece 10 having a flange 11 is secured to the front wall 12 of a camera casing by means of screws 13. The front piece 10 is provided with an internal bore for receiving a flange 14 of a first and stationary tube 15. For mounting the stationary tube 15 within said front piece the flange 14 of the stationary tube is provided with radial extensions or arms 14' (Fig. 3) registering in a certain position with radial openings 16 in a clamping ring 17. The clamping ring is provided with a handle 18 and mounted for rotary movement relatively to the front piece, the clamping ring being held in place by an externally threaded front ring 19. It is easily seen that the stationary tube 15 inserted into the front piece 10 in a position in which the radial arms 14' register with the corresponding openings 16 is firmly held in place after the clamping ring 10 is given a turn relatively to the tube 15.

A second tube 20 is rotatably mounted in the stationary tube 15. For imparting a rotary movement to the tube 20 a feather 21 is shown as secured to the tube by means of a screw 22. The feather 21 engages a longitudinal notch 23 in a focussing ring 24 which is also rotatable with respect to the front piece 10.

For rotating the focussing ring 24 a knob 25 is shown operating a crank 26, the latter being connected by a link 27 with an arm 28 of the focussing ring 24. It is easily seen from the drawings that a rotation of the crank 26 in the direction of the arrow 29 will effect a rotation of the focussing ring in the direction of the arrow 30.

The tube 20 is provided with a spiral-shaped slot 31 engaging a further feather 32 secured to an inner tube 33.

Upon a rotation of the second tube 20 with its spiral-shaped slot 31 the inner tube 33 will be moved in axial direction, a rotary movement of the same being prevented by a longitudinal groove 34 in the stationary tube 15 into which the feather 32 projects.

An objective lens, preferably of the composite type, is mounted in the inner tube 33 by means of a lens holder 35 and a ring 36, the latter being firmly held against an internal flange 37 of the inner tube by means of a threaded ring 38.

The view finder proper is shown in Fig. 4 as having in its casing 39 an eye-piece 40 through which the camera operator may observe the image produced by a view finder objective 41. The view finder objective produces an inverted image in its focal plane 42. The image is, in turn, inverted by suitable means indicated at 43 to appear upright in the eye-piece 40.

For defining the limits of the photographic field a reticle 44 is provided which may very suitably assume the form of a screen or mask 45 having apertures 46 therein. Another form of the reticle is shown in Fig. 6 as screen 45' having apertures 46'. For illuminating the screen there is shown a prism 47 receiving light from the object observed through the finder. A second objective 48, preferably of the type having a short focal length is associated with the reticle 44 for producing an image thereof in the focal plane 42 of the finder objective 41. For reflecting the image of the reticle into the path of light of the view finder a reflecting semi-transparent surface is shown at 49.

The reticle 44 and its objective 48 are shown as being adjustable with respect to each other and to the reflecting semi-transparent surface 49. For reasons of simplicity the means for adjusting the reticle and its objective are shown as including a shaft 50 driving screw-threaded worms 51 and 52 which engage nuts 53 and 54 for adjusting the objective 48 and the reticle 44, respectively, it being understood that other conventional adjusting elements may be used in place of the worms and nuts. A pinion 55 is provided for turning the shaft 50.

For operatively connecting the focussing means of the objective 35 with the view finder the second tube 20 (Fig. 1) is shown as provided with a cam 56. In bearings 57 and 58 a shaft 59 is mounted having a lever 60 secured to the one end thereof. The lever is provided with a roller 61, the latter being maintained in contact with the orifice of the cam 56 by means of a spring 62 tending to turn the shaft 59 in one direction. To the other end of the shaft 59 a toothed segment 63 is secured meshing with the view finder pinion 55.

The operation of the invention is as follows:

For focussing the camera objective 35 the knob 25 is turned which causes a rotary movement of the focussing ring 24. The notch of the latter engages the feather 21 of the second tube 20 thereby imparting a rotary movement to the same. The rotary movement of the second tube is transmitted to the inner tube 33 by means of the slot 31 and the feather 32 thereby moving the objective lens 35 into the proper focus.

On the other hand, the rotary movement of the inner tube 20 and its cam 56 which is secured thereto or integral therewith is transmitted through the lever 60 and segment 63 to the view finder adjusting mechanism.

The operator observing the object through the view finder simultaneously observes the image of the reticle defining the limits of the photographic field. The adjusting mechanism of the view finder is so adjusted that the image of the reticle appears always in the focus of the view finder. By moving the reticle towards the reflecting surface 49 the size of the reticle is decreased, the limits of the photographic field thereby appearing narrower.

The cam 56 can now easily be so shaped that the reticle is moved into the proper position relatively to the reflecting semi-transparent surface 49 that the field limits indicated thereby exactly coincide with the limits of the photographic field of the camera objective.

When a camera objective of different focal length is to be used in the camera it is inserted into the front piece 10 in a manner hereinbefore described. Each objective is provided with an individual operating cam 56 for the view finder which is so shaped that the image of the reticle in the view finder which appears as bright marks in the view finder image indicates the accurate limits of the photographic image produced by the camera objective on the light sensitive film.

Obviously, the present invention is not restricted to the particular embodiments herein shown and described. Moreover, it is not indispensable that all the features of this invention be used conjointly since they may be employed advantageously in various combinations, subcombinations and modifications.

What is claimed is:

1. In a photographic camera the combination with an objective lens, and means for focussing said lens; of a view finder having a first objective lens and eye-piece; a reticle for indicating the limits of the photographic field; means for illuminating said reticle; a second objective lens associated with said reticle and mounted to be adjustable relatively thereto; a reflecting semi-transparent surface in the path of light between said two objective lens of the view finder for reflecting into said path the image of said reticle produced in the focal plane of the first view finder objective by said second objective lens; and means operable by said focussing means for adjusting said reticle and said second objective lens relatively to said semi-transparent reflecting surface.

2. In a photographic camera the combination with a camera casing of a first tube mounted for axial movement relatively to said casing; a second tube surrounding said first tube and mounted for rotary movement relatively to said casing, said second tube having a spiral shaped groove cut therein; a feather on said first tube engaging said groove, whereby upon rotation of said second tube said first tube is axially displaced relatively to said casing; an objective lens mounted in said first tube; a cam on said second tube; a view finder; a reticle for indicating the limits of the photographic field; means for illuminating said reticle; a second objective lens associated with said reticle and mounted to be adjustable relatively thereto; a reflecting semi-transparent surface in the path of light between said two objective lens of the view finder for reflecting into said path the image of said reticle produced in the focal plane of the first view finder objective by said second objective lens, and means operable by said cam for adjusting said reticle and said second objective lens relatively to said semi-transparent reflecting surface.

PAUL HEINISCH.